(12) United States Patent
Gundavelli et al.

(10) Patent No.: US 10,820,202 B1
(45) Date of Patent: Oct. 27, 2020

(54) IDENTIFYING MULTIPLE SESSIONS ASSOCIATED WITH A USER EQUIPMENT

(71) Applicant: Cisco Technology, Inc., San Jose, CA (US)

(72) Inventors: Srinath Gundavelli, San Jose, CA (US); Indermeet Singh Gandhi, San Jose, CA (US); Oliver James Bull, Bristol (GB); Louis Gwyn Samuel, Wiltshire (GB); Pradeep Kumar Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/716,893

(22) Filed: Dec. 17, 2019

(51) Int. Cl.
*H04M 3/16* (2006.01)
*H04W 12/06* (2009.01)
*H04L 29/06* (2006.01)
*H04W 12/00* (2009.01)
*H04W 92/18* (2009.01)
*H04W 36/08* (2009.01)

(52) U.S. Cl.
CPC ..... *H04W 12/0609* (2019.01); *H04L 63/0823* (2013.01); *H04L 63/0876* (2013.01); *H04L 63/0892* (2013.01); *H04W 12/0027* (2019.01); *H04W 12/00512* (2019.01); *H04W 36/08* (2013.01); *H04W 92/18* (2013.01)

(58) Field of Classification Search
CPC ....... H04W 12/0609; H04W 12/00512; H04W 12/0027; H04W 92/18; H04W 36/08; H04L 63/0823; H04L 63/0876; H04L 63/0892

USPC ........................................................ 455/411
See application file for complete search history.

(56) References Cited

U.S. PATENT DOCUMENTS 10,021,566 B2 * 7/2018 Schroeder ......... H04W 12/0602
10,448,249 B2 * 10/2019 Pularikkal ........... H04L 63/0892
2018/0184340 A1 * 6/2018 Pularikkal ............. H04W 12/06

OTHER PUBLICATIONS

Valmikam et al., "Extensible Authentication Protocol (EAP) Attributes for Wi-Fi Integration with the Evolved Packet Core", Internet Engineering Task Force (IETF) Request for Comments 7458, Feb. 2015, 18 pages.
Adrangi et al., "Chargeable User Identity", Network Working Group, Request for Comments 4372, Jan. 2006, 10 pages.
(Continued)

*Primary Examiner* — Amancio Gonzalez
(74) *Attorney, Agent, or Firm* — Edell, Shapiro & Finnan, LLC (57) ABSTRACT

In one example, an authentication server generates a Chargeable User Identity (CUI) for a User Equipment (UE) based on a first indication of an identifier obtained from the UE based on communications of the UE over a first network interface of a system. The authentication server obtains a second indication of the identifier based on communications of the UE over a second network interface of the system. In response to obtaining the second indication of the identifier, the authentication server determines that the UE is attempting to communicate over the second network interface. In response to determining that the UE is attempting to communicate over the second network interface, the authentication server uses the CUI for further communications of the UE over the second network interface.

20 Claims, 7 Drawing Sheets

(56) References Cited

OTHER PUBLICATIONS

Khoury, "Android Q randomizes MAC addresses by default, with per-network customization", Apr. 5, 2019, 4 pages.
OPPO, "OPPO Unveils 'Game Color Plus' and 'Dual Wi-Fi' at Chinajoy to Optimize Gaming Experiences", Aug. 2, 2019, 14 pages.
Haasz, "P802.1CQ—Standard for Local and Metropolitan Area Networks: Multicast and Local Address Assignment", 42 pages, retrieved from Internet Dec. 13, 2019; https://standards.ieee.org/project/802_1CQ_html.
Armitage, "eduroam and CUI", Jisc community, Oct. 22, 2012, 3 pages.

* cited by examiner

FIG.1

| UE CAPABILITY | 5G CELLULAR IDENTITY | 4G CELLULAR IDENTITY | OBTAINED IDENTITY |
|---|---|---|---|
| CELLULAR AND WI-FI | PEI | IMEI, IMEISV | PEI, IMEI, IMEISV |
| CELLULAR AND WI-FI | SUCI | IMSI | SUCI, IMSI |
| WI-FI ONLY (MULTIPLE CONNECTIONS) | | | UUID |
| WI-FI ONLY (MULTIPLE CONNECTIONS) | | | STA SERIAL NUMBER |
| WI-FI ONLY (MULTIPLE CONNECTIONS) | | | HARDWARE MAC ADDRESS |

FIG. 2

| UE CAPABILITY | IDENTIFIER | OBTAINED IDENTIFIER | AUTHENTICATION SERVER | CUI | CTF | WLC | NPF |
|---|---|---|---|---|---|---|---|
| WLAN AP | RANDOM MAC 00:42:89:00:12:43 | SUCI | SUCI | SUCI, GENERATED STRING X | - | JOHN, CUI X | JOHN, SUCI, CUI X |
| WLAN AP | RANDOM MAC 00:1b:3c:42:22:33 | SUCI | SUCI | SUCI, GENERATED STRING X | - | JOHN, CUI X | JOHN, SUCI, CUI X |
| CELLULAR AP | SUCI | - | SUCI | SUCI, GENERATED STRING X | SUCI, CUI | - | JOHN, SUCI, CUI X |

| UE CAPABILITY | IDENTIFIER | OBTAINED IDENTIFIER | AUTHENTICATION SERVER | CUI | WLC | NPF |
|---|---|---|---|---|---|---|
| WLAN AP | RANDOM MAC 00:42:89:00:12:43 | UUID | UUID | UUID, GENERATED STRING Y | JOHN, CUI Y | JOHN, UUID, CUI Y |
| WLAN AP | RANDOM MAC 00:1b:3c:42:22:33 | UUID | UUID | UUID, GENERATED STRING Y | JOHN, CUI Y | JOHN, UUID, CUI Y |

FIG.6 ative server uses the CUI for further communications of the UE over the second network interface.

IDENTIFYING MULTIPLE SESSIONS ASSOCIATED WITH A USER EQUIPMENT

TECHNICAL FIELD

The present disclosure relates to computer networking.

BACKGROUND

Many enterprises maintain private Wireless Local Area Networks (WLANs), such as private Wi-Fi® networks. There is now a growing interest in private cellular networks, such as private 4th generation (4G) Long-Term Evolution (LTE) or 5th generation (5G) New Radio (NR) networks. For example, lightly/semi-licensed bands of the Citizens Broadband Radio Service (CBRS) spectrum may support these private cellular networks. It is anticipated that newly-deployed private cellular networks may co-exist with previously-deployed WLAN networks in the wireless architecture of a given enterprise.

DESCRIPTION OF EXAMPLE EMBODIMENTS

Overview

In one example embodiment, an authentication server generates a Chargeable User Identity (CUI) for a User Equipment (UE) based on a first indication of an identifier obtained from the UE based on communications of the UE over a first network interface of a system. The authentication server obtains a second indication of the identifier based on communications of the UE over a second network interface of the system. In response to obtaining the second indication of the identifier, the authentication server determines that the UE is attempting to communicate over the second network interface. In response to determining that the UE is attempting to communicate over the second network interface, the

Example Embodiments

Figure 1:
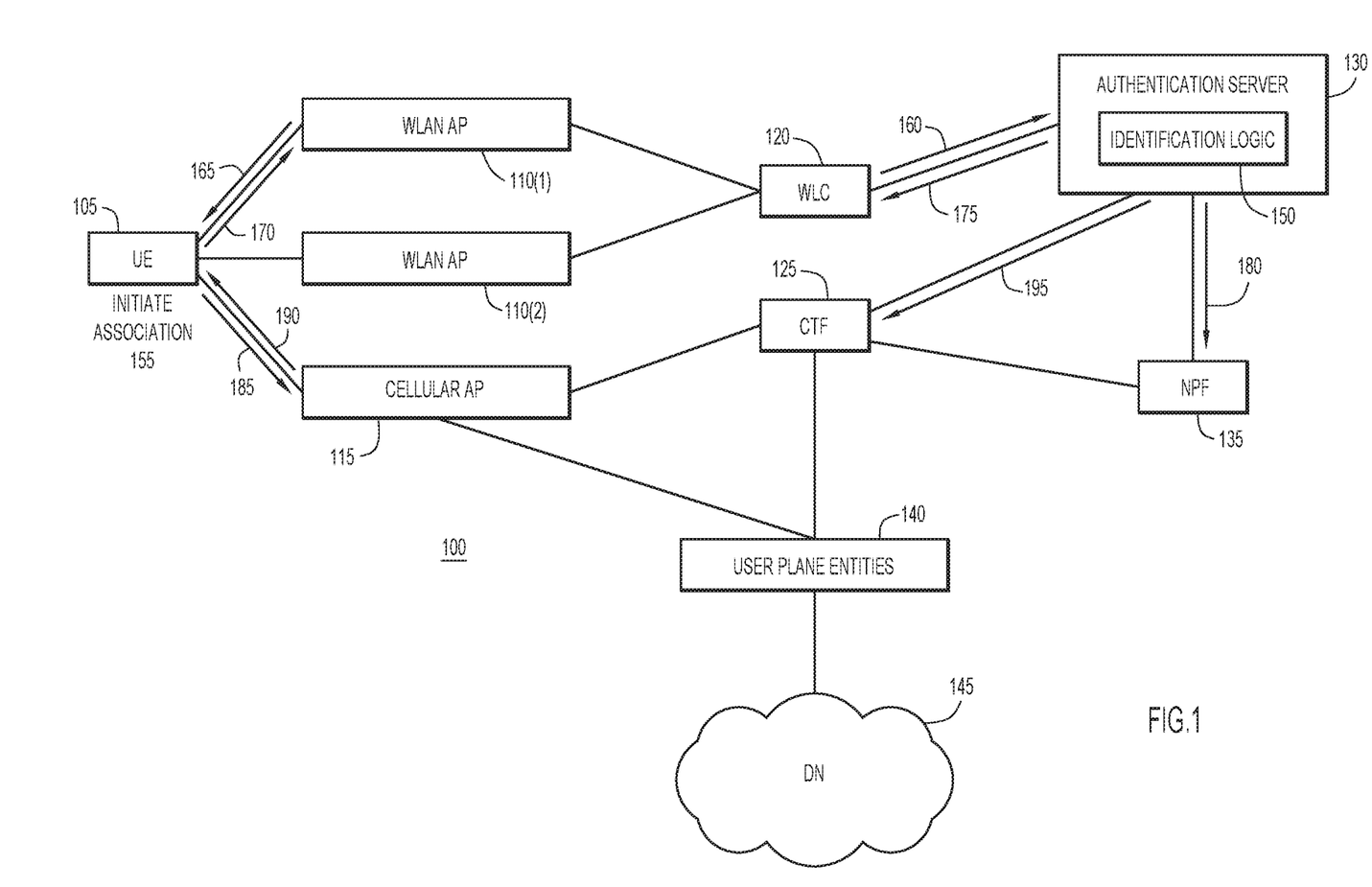
FIG. 1 illustrates a system for identifying multiple sessions associated with a single User Equipment (UE) using one or more radio technologies, according to an example embodiment.

FIG. 1 illustrates an example system 100 for identifying multiple User Equipment (UE) sessions. System 100 includes UE 105, Wireless Local Area Network (WLAN) Access Points (APs) 110(1) and 110(2) and cellular AP 115, WLAN Controller (WLC) 120, and Cellular Termination Function (CTF) 125. System 100 further includes authentication server 130, Network Policy Function (NPF) 135, user plane entities 140, and Data Network (DN) 145. In one example, system 100 may comprise a network associated with an enterprise, and a user of UE 105 may be associated with the enterprise (e.g., the user may be an enterprise employee).

UE 105 may be associated with any suitable device configured to initiate a session in system 100. For example, UE 105 may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects capable of initiating voice, audio, video, media, or data exchanges within system 100. UE 105 may also include any suitable interface to a human user such as a microphone, a display, a keyboard, or other terminal equipment. UE 105 may also be any device that seeks to initiate a communication on behalf of another entity or element such as a program, a database, or any other component, device, element, or object capable of initiating an exchange within system 100. UE 105 may be configured with appropriate hardware (e.g., processor(s), memory element(s), antennas and/or antenna arrays, baseband processors (modems), and/or the like), software, logic, and/or the like to facilitate one or more over-the-air (air) interfaces for accessing/connecting WLAN APs 110(1) and 110(2) and one or more air interface for accessing/connecting to cellular AP 115. It will be appreciated that any number of UEs may be present in system 100.

WLAN APs 110(1) and 110(2) may be configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi). In various embodiments, WLAN APs 110(1) and 110(2) may be implemented as a Wi-Fi APs and/or the like.

Cellular AP 115 may terminate a cellular (e.g., 4G Long-Term Evolution (LTE) or 5G New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). By 'private' it is meant that a private cellular access network provides network connectivity/services to clients (e.g., UE 105) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers, enterprises network operators/service providers, and/or third party network operators/service providers (e.g., neutral host network operators/service providers, cloud service providers, etc.). In various embodiments, cellular AP 115 may be implemented as any combination of an evolved Node B (eNB) to facilitate 4G LTE air accesses, a next generation Node B (gNB) to facilitate 5G NR air accesses, a next generation (nG) radio to facilitate any next generation air accesses, a CBRS Device (CBSD) to facilitate CBRS accesses, and/or the like now known or hereafter developed. Although illustrated as separate APs, in some embodiments WLAN AP 110(1), WLAN AP 110(2), and/or cellular AP 115 may be a combined AP to provide any combination of cellular and WLAN accesses. System 100 thus deploys private cellular access alongside WLAN access and enables UE 105 to connect to either of the access networks, or to both, at any given point in time.

WLC 120 may be a control plane entity associated with WLAN APs 110(1) and/or 110(2). WLC 120 may provide/be responsible for WLAN functions such as WLAN-based access authentication services, authorization services, intrusion prevention, Radio Frequency (RF) management, and/or the like to facilitate UE 105 connectivity via WLAN APs 110(1) and/or 110(2). In some implementations, WLC 120 may be configured as an evolved WLC (eWLC).

CTF 125 may be a control plane entity associated with cellular AP 115. CTF 125 may provide/be responsible for any combination of cellular-based access authentication services, authorization services, mobility management control, session management services with various functions being supported on a per-session basis, selection and control of user plane entities (e.g., per-session), if applicable, and/or the like. In various embodiments, CTF 125 may be implemented as any combination of functionality of a 4G LTE Mobility Management Entity (MME), a 4G Packet Data Network (PDN) Gateway (PGW), a 4G Serving gateway (i), a 5G Access and Mobility Management Function (AMF), a 5G Session Management Function (SMF) and/or the like now known or hereafter developed. WLC 120 and CTF 125 may be configured as separate entities or combined or converged as a single multi-access termination function configured to provide operations, functions, etc. for multiple accesses that may be provided via WLAN AP 110(1), WLAN AP 110(2), and/or cellular AP 115.

Authentication server 130 may be configured for user authentication and/or subscription management. Authentication server 130 may include functionality for cellular authentication and WLAN authentication (e.g., Home Subscriber Server (HSS), Authentication, Authorization, and Accounting (AAA) server, etc.). It will be appreciated that authentication server 130 may include cellular authentication and WLAN authentication functionality distributed across one or more servers.

NPF 135 may include a unified enterprise network controller responsible for managing UE 105 access to DN 145. In various embodiments for techniques presented herein, NPF 135 may be configured with one or more databases/repositories/etc. and/or may interface with one or more external databases/repositories/etc. in order to obtain and/or be configured with policy information for users/devices that may be present in system 100. Such internal/external databases/repositories/etc. may include any combination of enterprise databases, repositories, and/or the like for one or more users/devices (e.g., UE 105) that may be allowed to connect to accesses that may be provided via WLAN AP 110(1), WLAN AP 110(2), and/or cellular AP 115. In various embodiments, NPF 135 may be implemented as an enterprise policy server/manager and/or the like.

In some implementations NPF 135 may maintain a converged access profile configured for a particular user/device (e.g., UE 105) as a combined profile including multiple per-access type entries for each access type to which the particular user/device can connect. In other implementations, NPF 135 may maintain a converged access profile configured for a particular user/device (e.g., UE 105) using separate per-access profiles in which each per-access profile/entry for the particular user/device can be correlated together based on the user/device access specific identities/identifiers configured for each access type. For example, NPF 135 may correlate or link multiple entries/access type profiles for a converged access profile of a user/device such that a WLAN/wired access identifier/identity for the user/device can be mapped to a cellular (e.g., private LTE) access identity/identifier for the user/device, or vice-versa. NPF 135 may utilize such linking functionality when creating/maintaining/updating session information for a user/device for multiple accesses and/or for performing other operations/functions as described herein.

User plane entities 140 may interface with DN 145 to facilitate user plane (e.g., user data/data transfer) network connectivity for per-access device sessions. For example, if UE 105 latches onto WLAN access (WLAN APs 110(1) and/or 110(2)) and a session (e.g., a Wi-Fi user session) is started for UE 105 via the WLAN access, then UE 105 may access DN 145 via user plane entities 140 using user plane network connectivity (e.g., tunnels, etc.) that may be facilitated between WLAN APs 110(1) and/or 110(2) and user plane entities 140 using any technique as may be understood in the art, now known here and/or hereinafter developed. In another example, if UE 105 latches onto cellular access (cellular AP 115) and a session (e.g., a Protocol Data Unit (PDU) or PDN session) is started for the UE 105 via the cellular access, then the UE 105 may access DN 145 via user plane entities 140 using user plane network connectivity that may be facilitated between cellular AP 115 and user plane entities 140 using any technique as may be understood in the art, now known here and/or hereinafter developed.

In various embodiments, user plane entities 140 may be implemented as any 3GPP-based entities (e.g., Serving Gateways (SGWs), User Plane SGWs (SGW-Us), PGWs, User Plane PGWs (PGW-Us), combined SGWs/PGWs (e.g., System Architecture Evolution Gateways (SAEGWs), combined User Plane SGW/PGWs (e.g., S/PGW-Us, SAEGW-Us, etc.), Traffic Detection Functions (TDFs), User Plane Functions (UPFs) (e.g., in conjunction with one or more SMFs), and/or the like as may be understood in the art, now known here and/or hereinafter developed) and/or any non-3GPP-based entities (e.g., routers, switches, etc.).

In various embodiments, DN 145 may be any combination of the Internet, an Internet Protocol (IP) Multimedia Subsystem (IMS), Ethernet network, Ethernet switching system(s), enterprise network, and/or the like. DN 145 may facilitate user plane (e.g., user data/data transfer) connectivity for per-access UE sessions.

Traditionally, UEs are identified depending on the particular AP to which a given UE is attached. For example, consider a UE that has established a session via a WLAN AP and is identified based on a WLAN identifier (e.g., a Media Access Control (MAC) address) of the UE. If the UE subsequently establishes a new session via a cellular AP, the UE may be identified based on a cellular identifier (e.g., an International Mobile Subscriber Identifier (IMSI) and/or and International Mobile Equipment Identity (IMEI)) of the UE. This inconsistency in UE identifier usage can create difficulties in systems in which a UE can establish sessions with different APs associated with a single enterprise. In particular, such systems can have difficulty in determining whether a new session is associated with a UE that is new to the system, or is instead associated with a UE that is switching over from another AP within the system. In other words, conventional systems cannot correlate multiple sessions belonging to a given UE. As a result, these systems are unable to consistently apply/enforce network policies (e.g., relating to security, bandwidth usage, blacklisting, mobility, segmentation, etc.) to a given UE, detect stolen UEs, perform lawful interception, and other functions.

For example, enterprises have a responsibility to lawfully intercept all traffic flows from a given user/UE in order to comply with the applicable regulations. However, the enterprise network cannot perform accurate lawful interception without identifying all connections originating from a given UE and/or from a given user, regardless of the particular access technology that is used for establishing those connections. In another example, if a network security function detects the download of malware onto a UE using one access technology, the network security function may need to quarantine/blacklist the UE by blocking all wireless and wired connections from the impacted device. As with lawful interception, the network security function cannot successfully blacklist a UE without identifying which connections are originating from the same UE.

Furthermore, the problem of inconsistent UE identifiers is not limited to situations in which the UE moves from a WLAN AP to a cellular AP (or vice versa). This problem can also occur when the UE moves from one WLAN AP to another, particularly when the UE provides a new randomized MAC addresses for each new WLAN association. A randomized MAC address may be self-generated by the UE (e.g., an Ethernet client based on Wi-Fi using Ethernet emulation), or generated by any suitable network allocation scheme. Randomized MAC addresses may replace hardware (factory) MAC addresses for such UE identification. For example, consider a UE that has established a session via a first WLAN AP and is identified based on a first randomized MAC address of the UE. If the UE subsequently establishes a new session via a second WLAN AP, the UE may be identified based on a second randomized MAC address of the UE. This inconsistency in UE identifier usage can create difficulties similar to those discussed above. These difficulties may be particularly noticeable, for example, in UEs that support dual Wi-Fi connectivity to simultaneously connect to two different APs (or to the same AP), but use a dynamically generated randomized MAC address for each individual Wi-Fi session/connection.

Accordingly, identification logic 150 is provided in authentication server 130 to associate a stable identifier of UE 105 across multiple sessions. In one example, the stable identifier of UE 105 may be a Chargeable User Identity (CUI), which may be used to make the charging process for UE 105 more seamless. This may enable identification and correlation of all connections originating from UE 105, irrespective of the particular access technology that is used for each of those connections (including dual-connectivity connections). Consistent network policies may therefore be applied to UE 105 even when UE 105 establishes new sessions with different APs (e.g., WLAN APs 110(1) or 110(2) or cellular AP 115).

In one example, at 155, UE 105 first initiates WLAN association with WLAN AP(s) 110(1) and/or 110(2) using randomized MAC addresses. As part of the WLAN association process, UE 105 may provide, to WLAN AP(s) 110(1) and/or 110(2), an indication that UE 105 is capable of supporting cellular communication(s), as well as the specific type of the supported cellular communication(s). For example, UE 105 may indicate support for 4G LTE and/or 5G NR through a cellular capability Information Element (IE) provided to WLAN AP(s) 110(1) and 110(2).

At 160, authentication server 130 may obtain, from WLAN APs 110(1) and/or 110(2) (e.g., via WLC 120), the indication that UE 105 is capable of supporting cellular communication(s). Authentication server 130 may obtain this indication in an access request message (e.g., Remote Authentication Dial-In User Service (RADIUS) Attribute Value Pairs (AVP)). Authentication server 130 may provide a request for a cellular identifier used by UE 105 to communicate with cellular AP 115. At 165, authentication server 130 may provide the request (e.g., via WLC 120 and WLAN AP 110(1)) to UE 105. At 170, UE 105 may respond with an indication of the cellular identifier used by UE 105 to communicate with cellular AP 115, and authentication server 130 may obtain the indication (e.g., via WLAN AP 110(1) and WLC 120).

Authentication server 130 may generate a CUI based on the cellular identifier and assign the CUI to UE 105. The CUI may uniquely identify UE 105 for all sessions (e.g., WLAN, cellular, etc.) originating from UE 105. Thus, authentication server 130 may identify accounting records of cellular and/or multiple separate WLAN connections of UE 105 through a common CUI (even where the WLAN connections have different randomized MAC addresses). Furthermore, the CUI may take any suitable form. In one example, the CUI string may be based on (e.g., identical to or derived from) the cellular identifier of UE 105. In another example, the CUI string may be independently generated by authentication server 130 or any other suitable network entity. At 175, authentication server 130 may provide the CUI to WLC 120 as a CUI AVP in a RADIUS access accept message. At 180, authentication server 130 may also provide the cellular identifier of UE 105 and/or the CUI to NPF 135.

Subsequently, UE 105 may move to cellular network coverage and, at 185, provide an initial cellular (e.g., LTE/NR) attach message (e.g., a 5G registration request) to CTF 125 (e.g., via cellular AP 115). In one example, the initial cellular attach message may include an indication of the cellular identifier of UE 105. In another example, the initial cellular attach message does not include an indication of the cellular identifier of UE 105 (or includes a different cellular identifier than the cellular identifier associated with the CUI at authentication server 130). In this case, at 190, CTF 125 may respond to the initial attach message (e.g., via cellular AP 115) with a N1/Non-Access Stratum (NAS) identity request to obtain an indication of the cellular identifier of UE 105. UE 105 then provides an indication of the cellular identifier of UE 105. Thus, CTF 125 obtains an indication of the cellular identifier of UE 105.

Authentication server 130 may obtain an indication of the cellular identifier of UE 105 based on the communications between UE 105 and cellular AP 115 (and CTF 125). For example, authentication server 130 may obtain an indication of the cellular identifier of UE 105 from CTF 125 as part of a query for any existing sessions (e.g., Wi-Fi sessions) with the same cellular identifier. Authentication server 130 determines that UE 105, which was previously communicating over WLAN AP(s) 110(1) and/or 110(2), is now attempting to communicate over cellular AP 115. In response to determining that UE 105 is attempting to communicate over cellular AP 115, authentication server 130 may use the CUI for further communications between UE 105 and cellular AP 115 (e.g., to track accounting parameters across the previous WLAN session and the ongoing cellular session). At 195, authentication server 130 may also provide the CUI to CTF 125.

Authentication server 130 may thus correlate multiple sessions (e.g., WLAN and/or cellular) to identify UE 105 across the multiple sessions. This may enable NPF 135 to obtain visibility of sessions originating from UE 105. In response to determining that UE 105 is attempting to communicate over cellular AP 115, authentication server 130 (and/or other network entities such as NPF 135) may enforce one or more network policies for UE 105 that were also applied to the WLAN session(s) (e.g., relating to bandwidth usage, blacklisting, mobility, segmentation, etc.).

In the aforementioned example, UE 105 first initiated WLAN association, and subsequently moved to cellular network coverage. Techniques described herein may also support UE 105 first initiating cellular network communications, and subsequently moving to WLAN coverage. In particular, when UE 105 begins cellular access, authentication server 130 may obtain a first indication of a cellular identifier from UE 105 over cellular AP 115. Authentication server 130 may generate a CUI for UE 105 based on the first indication of the cellular identifier.

Subsequently, when UE 105 activates WLAN access, authentication server 130 may obtain a second indication of the cellular identifier based on communications over WLAN AP 110(1) or 110(2). Authentication server 130 may negotiate with UE 105 to provide the second indication of the cellular identifier in a similar manner as discussed above. For example, authentication server 130 may provide a request for the cellular identifier to UE 105 and, in response, obtain the second indication of the cellular identifier.

In response to obtaining the second indication of the cellular identifier, authentication server 130 determines that UE 105 is attempting to communicate over WLAN AP 110(1) or 110(2). In response, authentication server 130 uses the previously existing/generated CUI associated with UE 105 for further communications between UE 105 and WLAN AP 110(1) or 110(2). Thus, the same CUI may be associated with the WLAN session and the cellular session. Authentication server 130 may further enforce a network policy for UE 105 and/or provide the CUI to CTF 125.

Techniques described herein may also support tracking UE 105 across multiple WLAN sessions. It will be appreciated that in this example, UE 105 may be capable of both WLAN and cellular communications, or WLAN communications only. This may apply to single and/or dual WLAN connectivity. In the example of dual WLAN connectivity, UE 105 may use randomized MAC addresses to initiate multiple associations to WLAN APs 110(1) and 110(2). For example, UE 105 may have dual-connectivity capability and may use randomized MAC address 00:42:89:00:12:43 for the session with WLAN AP 110(1), and may use randomized MAC address 00:1b:3c:42:22:33 for the session with WLAN AP 110(2). It will be appreciated that randomized MAC addresses 00:42:89:00:12:43 and 00:1b:3c:42:22:33 are merely examples, and that any suitable randomized MAC addresses may be used.

As part of the WLAN association process for tracking UE 105 across multiple WLAN sessions, authentication server 130 may obtain an access request message (e.g., RADIUS AVP) from UE 105. Authentication server 130 may provide a request for a WLAN identifier (e.g., different from the randomized MAC address) used by UE 105 to communicate with WLAN AP 110(2). Authentication server 130 may provide the request to UE 105. UE 105 may respond with an indication of the WLAN identifier used by UE 105 to communicate with WLAN AP 110(2), and authentication server 130 may obtain the indication.

Authentication server 130 may generate a CUI based on the WLAN identifier and assign the CUI to UE 105. The CUI may uniquely identify UE 105 for all sessions originating from UE 105. Thus, authentication server 130 may identify accounting records of multiple separate WLAN connections of UE 105 through a common CUI (even where the WLAN connections have different randomized MAC addresses). Authentication server 130 may also provide the cellular identifier of UE 105 and/or the CUI to NPF 135.

Subsequently (or concurrently), UE 105 may provide network communications to WLAN AP 110(2) including an indication of the WLAN identifier of UE 105, and WLC 120 obtains an indication of the WLAN identifier of UE 105. Authentication server 130 may obtain an indication of the WLAN identifier of UE 105 based on the communications between UE 105 and WLAN AP 110(2) (and WLC 120). Authentication server 130 determines that UE 105, which is/was communicating over WLAN AP 110(1), is now attempting to communicate over WLAN AP 110(2). In response to determining that UE 105 is attempting to communicate over WLAN AP 110(2), authentication server 130 may use the CUI for further communications between UE 105 and WLAN AP 110(2) (e.g., to track accounting parameters across both WLAN sessions). Authentication server 130 may also provide the CUI to WLC 120.

In this example, authentication server 130 may associate multiple WLAN connections (each with its own randomized MAC) with a single CUI. Authentication server 130 may thus correlate multiple WLAN sessions to identify UE 105 across those sessions. This may enable NPF 135 to obtain visibility of WLAN sessions originating from UE 105. In response to determining that UE 105 is attempting to communicate over WLAN AP 110(2), authentication server 130 (and/or other network entities such as NPF 135) may enforce one or more network policies for UE 105 that were also applied to the WLAN session associated with WLAN AP 110(1) (e.g., relating to bandwidth usage, blacklisting, mobility, segmentation, etc.).

Figure 2:
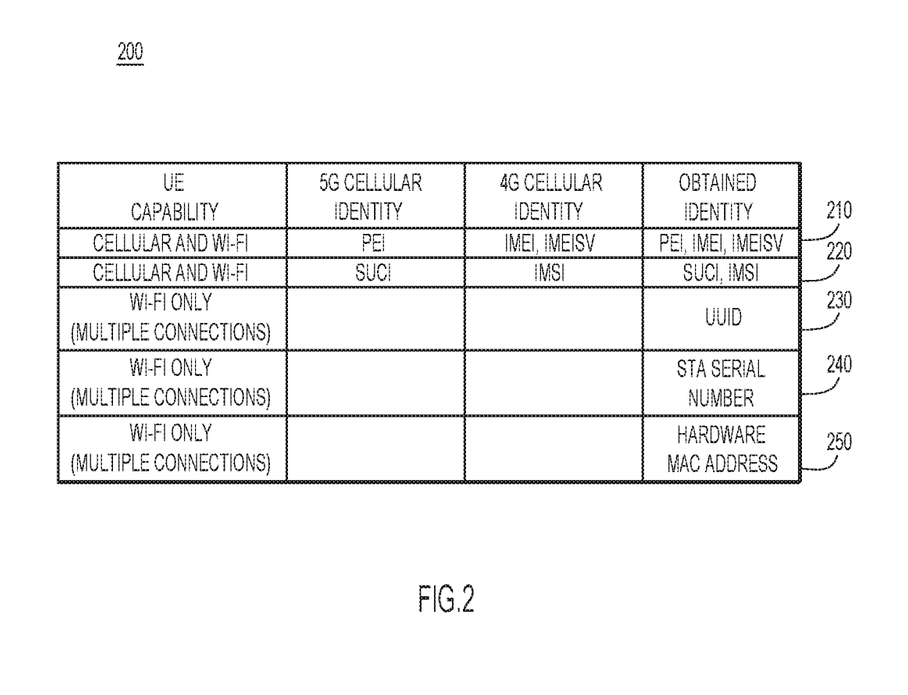
FIG. 2 illustrates a table of possible UE identifiers to identify multiple sessions associated with the UE, according to an example embodiment.

With continued reference to FIG. 1, FIG. 2 illustrates an example table 200 of possible UE identifiers to identify multiple sessions associated with UE 105. Table 200 includes rows 210-250. As shown in row 210, if UE 105 is configured for both cellular and WLAN connectivity, UE 105 may be identified using a Permanent Equipment Identifier (PEI) for 5G connectivity and/or IMEI or IMEI Software Version (IMEISV) for 4G connectivity. For example, authentication server 130 may obtain the PEI, IMEI, and/or IMEISV from UE 105. As additionally/alternatively shown in row 220, if UE 105 is configured for both cellular and WLAN connectivity, UE 105 may be identified using a Subscription Concealed Identifier (SUCI) for 5G connectivity and/or an IMSI for 4G connectivity. For example, authentication server 130 may obtain the SUCI and/or IMSI from UE 105. Thus, if UE 105 is configured for both cellular and WLAN connectivity, in one example PEI and/or IMEI/IMEISV may be used to correlate between different sessions (row 210), and in another example SUCI and/or IMSI may be used to correlate between different sessions (row 220).

As additionally/alternatively shown in row 230, if UE 105 is configured only for WLAN connectivity (e.g., for multiple Wi-Fi connections), UE 105 may be identified using a Universally Unique Identifier (UUID). For example, authentication server 130 may obtain the UUID from UE 105. As additionally/alternatively shown in row 240, if UE 105 is configured only for WLAN connectivity, UE 105 may be identified using a Station (STA) serial number. For example, authentication server 130 may obtain the STA serial number from UE 105. As additionally/alternatively shown in row 250, if UE 105 is configured only for WLAN connectivity, UE 105 may be identified using a hardware MAC address (which is distinct from a randomized MAC address). For example, authentication server 130 may obtain the hardware MAC address from UE 105.

In one example, UE 105 may be identified using a certificate-based identifier. For instance, authentication server 130 may generate a certificate (e.g., an X.509-based certificate) for UE 105 as part of an onboarding process (e.g., a Mobile Device Management (MDM) procedure). Authentication server 130 may also generate a public and a private key for UE 105. The certificate may include a stable/permanent/unique identifier and the public key, and may be signed by authentication server 130. Using MDM protocol, authentication server 130 may deliver the certificate, and the public/private key to UE 105. UE 105 may obtain/store the certificate and assert the identity of UE 105 by providing the certificate. UE 105 may also prove that UE 105 is the owner of the certificate, as UE 105 has the private key associated with the public key that is embedded in the certificate. Any time UE 105 connects over a WLAN or a cellular network, UE 105 may present this certificate, which includes a unique identifier of UE 105. Authentication server 130 may obtain one or more parameters of the certificate from UE 105 and generate the CUI using the certificate on both Wi-Fi and cellular access.

It will be appreciated that although specific types of identifiers are discussed, any suitable identifiers (e.g., any stable/permanent identifiers) may be used in accordance with techniques described herein. A stable identifier may be a consistent identifier for a device within a particular system, and a permanent identifier may be a consistent identifier for a device across multiple systems. The determination as to which identifier to use may be made based on any suitable factor(s) by any suitable entity of system 100. In one example, authentication server 130 may specify the particular identifier type. In another example, authentication server 130 may permit UE 105 to choose the particular identifier type, and UE 105 may signal to authentication server 130 as to the chosen identifier type (in addition to the identifier itself). In yet another example, UE 105 may negotiate with authentication server 130 to choose the particular identifier type. Authentication server 130 and/or UE 105 may have a preferred order of identifier types, which may impact these negotiations. Authentication server 130 and/or UE 105 may also select/negotiate which interface to use (e.g., WLAN AP 110(1), WLAN AP 110(2), cellular AP 115 (4G versus 5G), etc.) based on statistical and/or historical network performance data. For example, UE 105 may also provide authentication server 130 with an indication of a preferred interface. In one example, authentication server 130 and/or NPF 135 may use the identifier itself as an indication of a network type and/or interface preferred by UE 105.

Figure 3A:
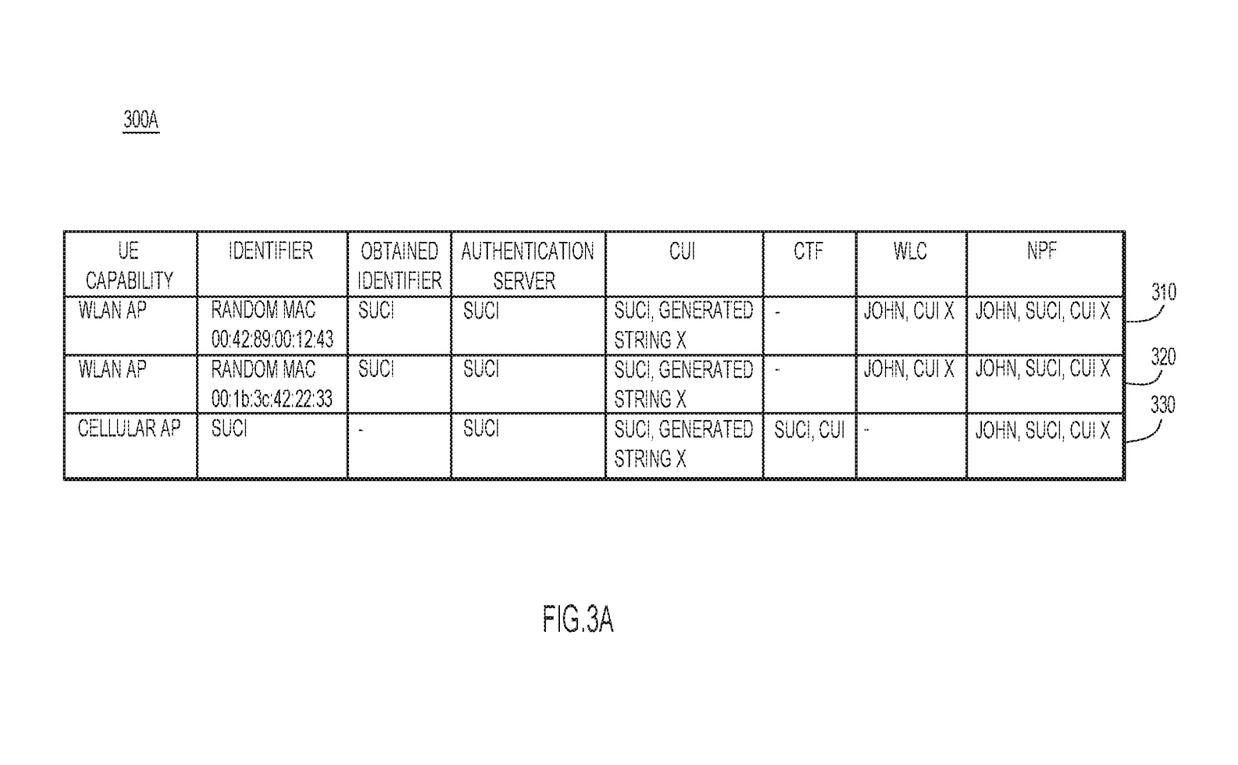
FIG. 3A illustrates one or more UE identifiers used by various network entities to identify a UE capable of communicating with at least one Wireless Local Area Network (WLAN) Access Point (AP) and at least one cellular network AP, according to an example embodiment.

With continued reference to FIG. 1, FIG. 3A illustrates an example table 300A of one or more UE identifiers used by various network entities to identify a UE capable of communicating with at least one WLAN AP and at least one cellular network AP. Table 300A includes rows 310-330. As shown in rows 310 and 320, UE 105 initially uses randomized MAC address 00:42:89:00:12:43 for the session with WLAN AP 110(1), and uses randomized MAC address 00:1b:3c:42:22:33 for the session with WLAN AP 110(2). It will be appreciated that randomized MAC addresses 00:42:89:00:12:43 and 00:1b:3c:42:22:33 are merely examples, and that any suitable randomized MAC addresses may be used. Authentication server 130 obtains a SUCI that UE 105 will use for association with cellular AP 115, which in this example is a 5G cellular AP (e.g., gNB). Authentication server 130 further stores the SUCI and generates the CUI, and provides the CUI to WLC 120 and NPF 135. WLC 120 associates the CUI with a WLAN user identifier (e.g., a Wi-Fi identifier, such as 'John'), and NPF 135 associates the CUI with the WLAN user identifier and the SUCI. As shown in row 330, UE 105 subsequently uses the SUCI for the session with cellular AP 115. Authentication server 130 obtains the SUCI, determines that a corresponding CUI already exists, and provides an indication of such to CTF 125 and NPF 135. CTF 125 may associate the CUI with the SUCI.

Figure 3B:
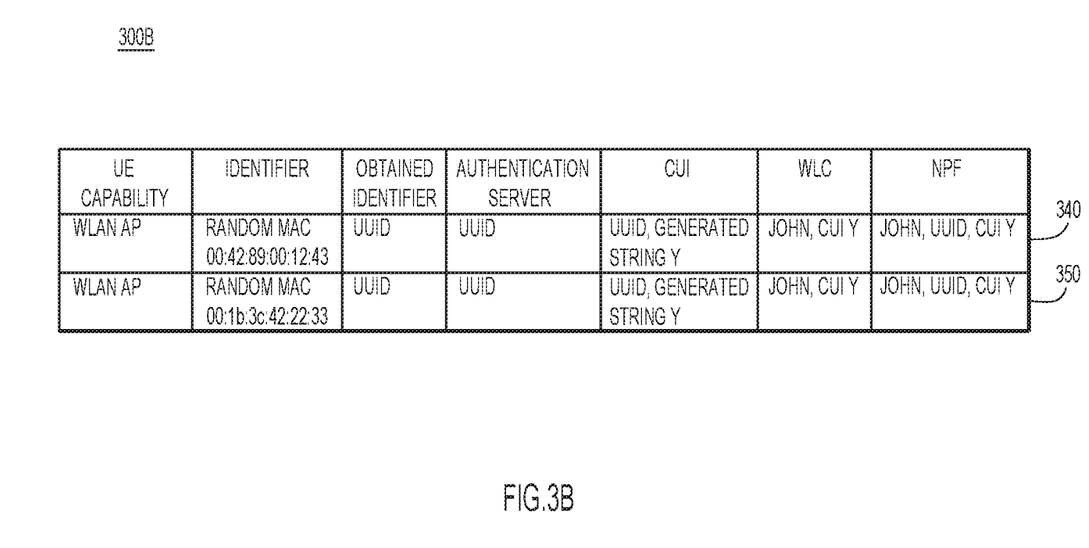
FIG. 3B illustrates one or more UE identifiers used by various network entities to identify a UE capable of communicating with at least one WLAN AP, according to an example embodiment.

With continued reference to FIG. 1, FIG. 3B illustrates an example table 300B of one or more UE identifiers used by various network entities to identify a UE capable of communicating with at least one WLAN AP. Table 300A includes rows 340 and 350. In this example, UE 105 uses randomized MAC address 00:42:89:00:12:43 for the session with WLAN AP 110(1), and uses randomized MAC address 00:1b:3c:42:22:33 for the session with WLAN AP 110(2). It will be appreciated that randomized MAC addresses 00:42:89:00:12:43 and 00:1b:3c:42:22:33 are merely examples, and that any suitable randomized MAC addresses may be used. As shown in row 340, UE 105 initially uses a UUID for the session with WLAN AP 110(1). Authentication server 130 obtains the UUID, which UE 105 will use for association with WLAN AP 110(2). Authentication server 130 further stores the UUID and generates the CUI, and provides the CUI to WLC 120 and NPF 135. WLC 120 associates the CUI with a WLAN user identifier, and NPF 135 associates the CUI with the WLAN user identifier and the UUID. As shown in row 350, UE 105 subsequently uses the UUID for the session with WLAN AP 110(2). Authentication server 130 obtains the UUID, determines that a corresponding CUI already exists, and provides an indication of such to WLC 120 and NPF 135.

Figure 4:
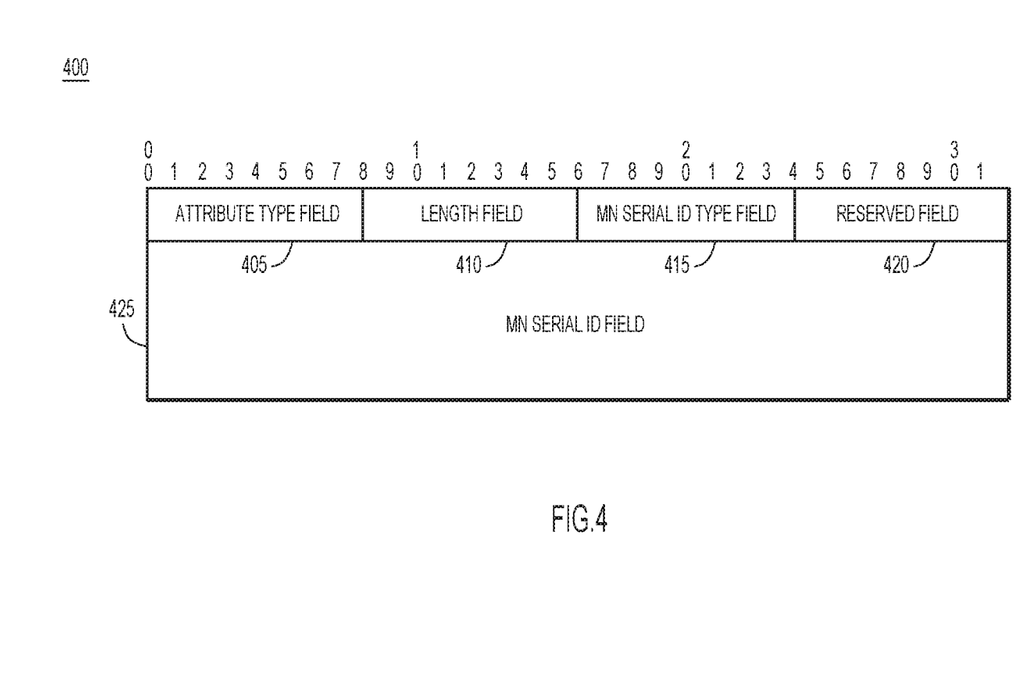
FIG. 4 illustrates a format for a mobile node serial identifier attribute used to convey an identifier of a UE as an Extensible Authentication Protocol (EAP) attribute, according to an example embodiment.

With continued reference to FIG. 1, FIG. 4 illustrates an example format for an attribute 400 used to convey an identifier of UE 105. In this example, authentication server 130 may initiate an Extensible Authentication Protocol (EAP) identity request during EAP exchange when UE 105 begins the initial association procedure. In the EAP identity request, authentication server 130 requests attribute 400 with the identifier of UE 105, depending upon the capability of UE 105. Briefly, authentication server 130 may provide the EAP identity request to UE 105 to provide the identifier over a secure EAP connection, and authentication server 130 may further obtain the identifier in attribute 400 from UE 105 in an EAP identity response.

Attribute 400 includes an attribute type field 405, a length field 410, a Mobile Node (MN) serial Identifier (ID) type field 415, a reserved field 420, and an MN serial ID field 425. Attribute type field 405 indicates that attribute 400 is a MN serial identifier attribute. Length field 410 indicates the length of the attribute. MN serial ID type field 415 identifies the type of the MN serial ID. Reserved field 420 is reserved for any suitable purpose. MN serial ID field 425 indicates the identifier itself.

Traditional MN serial identifier attributes were developed for service providers to identify stolen UEs. As described herein, attribute 400 is used to correlate multiple WLAN/cellular sessions from the same device (e.g., UE 105). To that end, attribute 400 is provided with enhanced capabilities. For example, MN serial ID type field 415 may include an indication of the numbers 0-8 to indicate a respective type of MN serial ID, which is provided in MN serial ID field 425. '0' may be reserved. '1' may indicate that MN serial ID field 425 includes an indication of the IMEI of UE 105. '2' may indicate that MN serial ID field 425 includes an indication of the IMEISV of UE 105. '3' may indicate that MN serial ID field 425 includes an indication of the PEI of UE 105. '4' may indicate that MN serial ID field 425 includes an indication of the IMSI of UE 105. '5' may indicate that MN serial ID field 425 includes an indication of the SUCI of UE 105. '6' may indicate that MN serial ID field 425 includes an indication of the UUID of UE 105. '7' may indicate that MN serial ID field 425 includes an indication of the STA serial number of UE 105. '8' may indicate that MN serial ID field 425 includes an indication of the hardware MAC address of UE 105.

It will be appreciated that authentication server 130 may obtain the indication of the identifier of UE 105 via any suitable mechanism. In one example, authentication server 130 may query the identifier of UE 105 using attribute 400. In another example, a Vendor Specific Attribute (VSA) EAP ID or other EAP attribute may be defined to provide the identity of UE 105 securely to authentication server 130.

Figure 5:
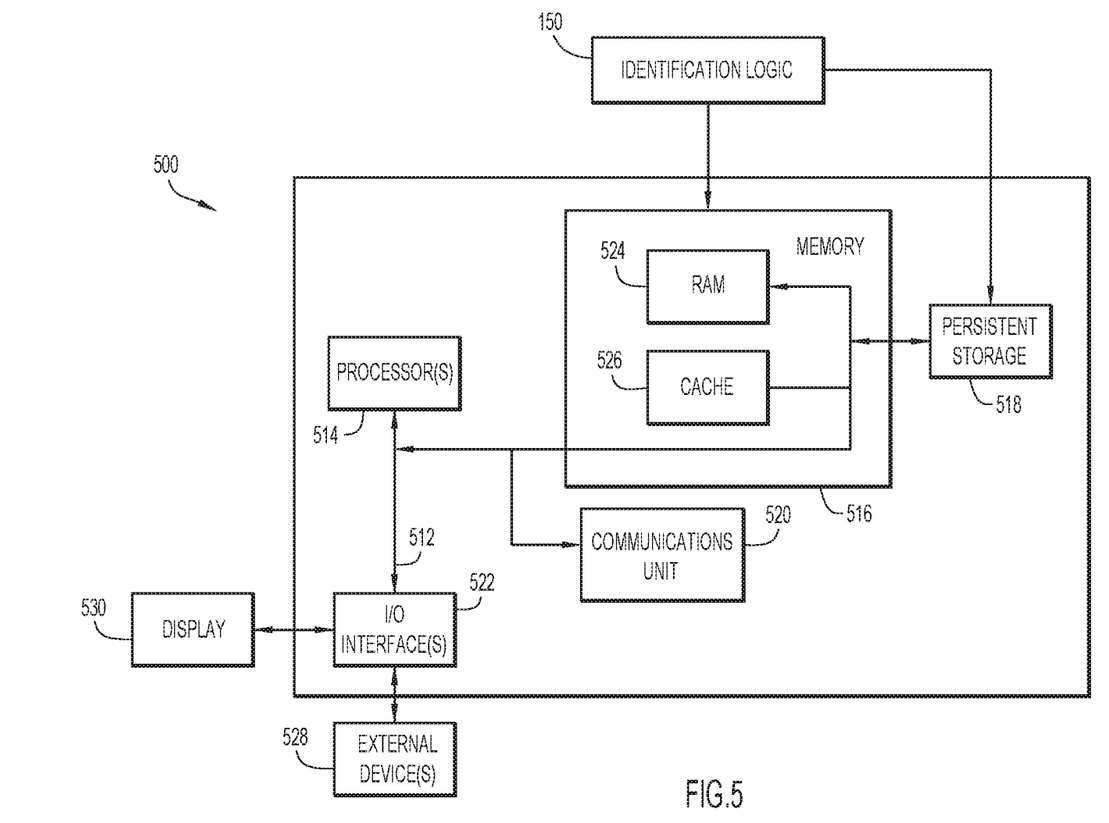
FIG. 5 illustrates a block diagram of a computing device configured to identify multiple sessions associated with a single UE, according to an example embodiment.

FIG. 5 illustrates a hardware block diagram of an example device 500 (e.g., authentication server 130). It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and Input/Output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes Random Access Memory (RAM) 524 and cache memory 526. In general, memory 516 can include any suitable volatile or non-volatile computer readable storage media. Instructions for identification logic 150 may be stored in memory 516 or persistent storage 518 for execution by computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to device 500. For example, I/O interface(s) 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

Figure 6:
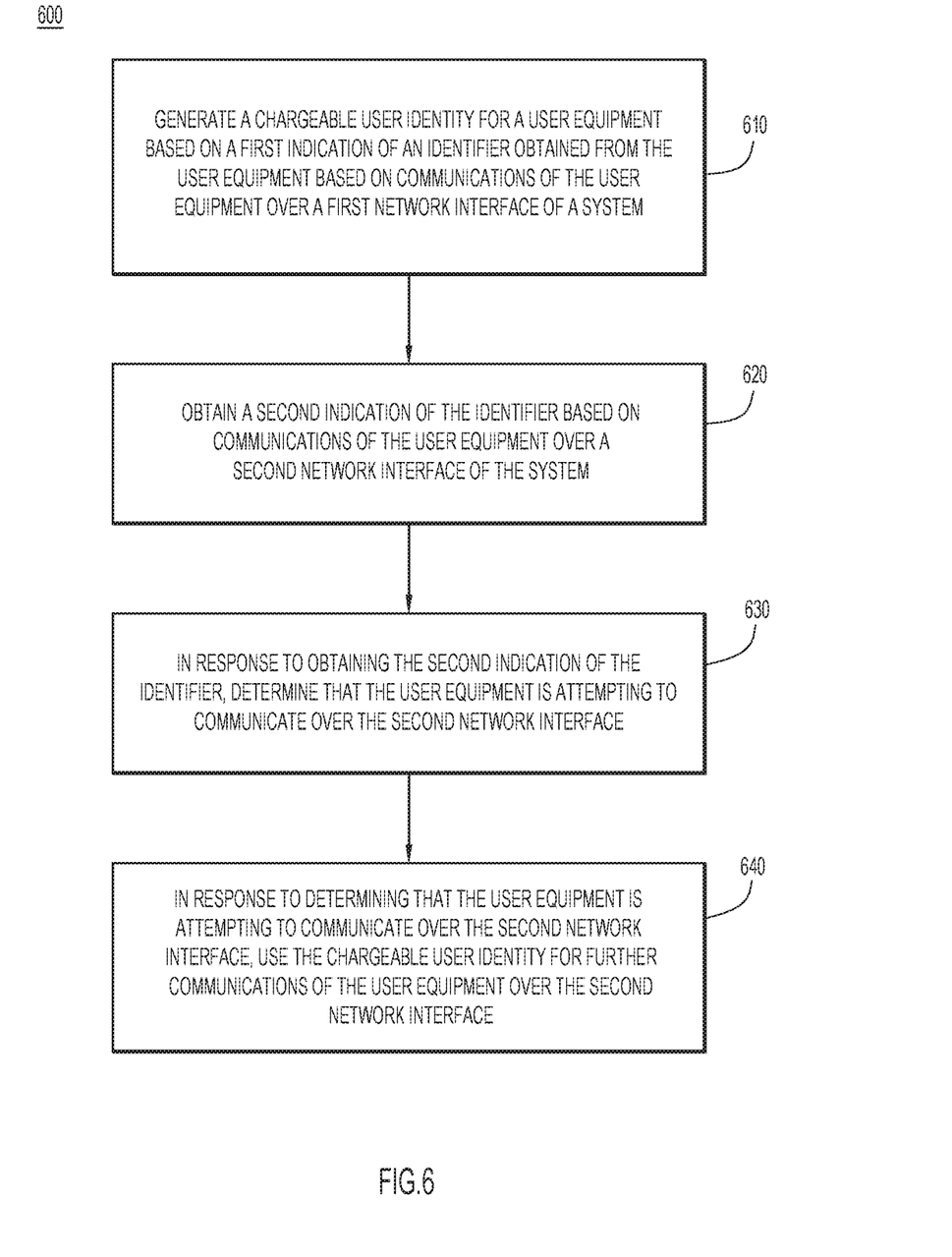
FIG. 6 illustrates a flowchart of a method for identifying multiple sessions associated with a single UE, according to an example embodiment.

FIG. 6 is a flowchart of an example method 600 for identifying multiple sessions associated with a single UE. In this example, authentication server 130 performs method 600. At 610, authentication server 130 generates a CUI for a UE based on a first indication of an identifier obtained from the UE based on communications of the UE over a first network interface of a system. At 620, authentication server 130 obtains a second indication of the identifier based on communications of the UE over a second network interface of the system. At 630, in response to obtaining the second indication of the identifier, authentication server 130 determines that the UE is attempting to communicate over the second network interface. At 640, in response to determining that the UE is attempting to communicate over the second network interface, authentication server 130 uses the CUI for further communications of the UE over the second network interface.

Techniques are described herein for an enterprise network to obtain an identity of a device upon indication of device cellular capability and type. An MN SERIAL ID EAP attribute (or any other suitable attribute) may be used to securely obtain the device identity for correlating device sessions across private 5G/LTE and Wi-Fi. Multiple Wi-Fi association (with randomized MAC addresses) may also be identified from the same device. A single CUI may be generated for multiple sessions originating from the same device whether on Wi-Fi and/or private 5G/LTE. The same CUI/device identity may also be provided for multiple sessions originated on Wi-Fi and LTE to an NPF for enterprise-level visibility. Enterprise-specific policies (e.g., bandwidth usage, blacklisting, mobility, segmentation, etc.) and accounting records may thus be applied across sessions and devices.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: generating a chargeable user identity for a user equipment based on a first indication of an identifier obtained from the user equipment based on communications of the user equipment over a first network interface of a system; obtaining a second indication of the identifier based on communications of the user equipment over a second network interface of the system; in response to obtaining the second indication of the identifier, determining that the user equipment is attempting to communicate over the second network interface; and in response to determining that the user equipment is attempting to communicate over the second network interface, using the chargeable user identity for further communications of the user equipment over the second network interface.

In one example, the method further comprises: providing a request for the identifier; and in response to the request, obtaining the first indication of the identifier or the second indication of the identifier.

In one example, the method further comprises: in response to determining that the user equipment is attempting to communicate over the second network interface, enforcing a network policy for the user equipment.

In one example, the method further comprises: providing the chargeable user identity to a control plane entity associated with the second network interface.

In one example, the first indication of the identifier or the second indication of the identifier includes an indication of a mobile node serial identifier.

In one example, the identifier is based on one or more parameters of a certificate of the user equipment.

In one example, the first network interface is a first one of a wireless local area network access point and a cellular network access point, and the second network interface is a second one of the wireless local area network access point and the cellular network access point.

In one example, the first network interface is a first wireless local area network access point, and the second network interface is a second wireless local area network access point.

In another form, an apparatus is provided. The apparatus comprises: a communication interface configured to obtain or provide network communications; and one or more processors coupled to the network interface, wherein the one or more processors are configured to: generate a chargeable user identity for a user equipment based on a first indication of an identifier obtained from the user equipment based on communications of the user equipment over a first network interface of a system; obtain a second indication of the identifier based on communications of the user equipment over a second network interface of the system; in response to obtaining the second indication of the identifier, determine that the user equipment is attempting to communicate over the second network interface; and in response to determining that the user equipment is attempting to communicate over the second network interface, use the chargeable user identity for further communications of the user equipment over the second network interface.

In another form, one or more non-transitory computer readable storage media are provided. The non-transitory computer readable storage media are encoded with instructions that, when executed by a processor, cause the processor to: generate a chargeable user identity for a user equipment based on a first indication of an identifier obtained from the user equipment based on communications of the user equipment over a first network interface of a system; obtain a second indication of the identifier based on communications of the user equipment over a second network interface of the system; in response to obtaining the second indication of the identifier, determine that the user equipment is attempting to communicate over the second network interface; and in response to determining that the user equipment is attempting to communicate over the second network interface, use the chargeable user identity for further communications of the user equipment over the second network interface.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
generating a chargeable user identity for a user equipment based on a first indication of an identifier obtained from the user equipment based on communications of the user equipment over a first network interface of a system;

obtaining a second indication of the identifier based on communications of the user equipment over a second network interface of the system;

in response to obtaining the second indication of the identifier, determining that the user equipment is attempting to communicate over the second network interface; and in response to determining that the user equipment is attempting to communicate over the second network interface, using the chargeable user identity for further communications of the user equipment over the second network interface.

2. The method of claim 1, further comprising:
providing a request for the identifier; and
in response to the request, obtaining the first indication of the identifier or the second indication of the identifier.

3. The method of claim 1, further comprising:
in response to determining that the user equipment is attempting to communicate over the second network interface, enforcing a network policy for the user equipment.

4. The method of claim 1, further comprising:
providing the chargeable user identity to a control plane entity associated with the second network interface.

5. The method of claim 1, wherein the first indication of the identifier or the second indication of the identifier includes an indication of a mobile node serial identifier.

6. The method of claim 1, wherein the identifier is based on one or more parameters of a certificate of the user equipment.

7. The method of claim 1, wherein the first network interface is a first one of a wireless local area network access point and a cellular network access point, and the second network interface is a second one of the wireless local area network access point and the cellular network access point.

8. The method of claim 1, wherein the first network interface is a first wireless local area network access point, and the second network interface is a second wireless local area network access point.

9. An apparatus comprising:
a communication interface configured to obtain or provide network communications; and
one or more processors coupled to the communication interface, wherein the one or more processors are configured to:
generate a chargeable user identity for a user equipment based on a first indication of an identifier obtained from the user equipment based on communications of the user equipment over a first network interface of a system;
obtain a second indication of the identifier based on communications of the user equipment over a second network interface of the system;
in response to obtaining the second indication of the identifier, determine that the user equipment is attempting to communicate over the second network interface; and
in response to determining that the user equipment is attempting to communicate over the second network interface, use the chargeable user identity for further communications of the user equipment over the second network interface.

10. The apparatus of claim 9, wherein the one or more processors are further configured to:
provide a request for the identifier; and
in response to the request, obtain the first indication of the identifier or the second indication of the identifier.

11. The apparatus of claim 9, wherein the one or more processors are further configured to:
in response to determining that the user equipment is attempting to communicate over the second network interface, enforce a network policy for the user equipment.

12. The apparatus of claim 9, wherein the one or more processors are further configured to:
provide the chargeable user identity to a control plane entity associated with the second network interface.

13. The apparatus of claim 9, wherein the one or more processors are further configured to:
obtain an indication of a mobile node serial identifier.

14. The apparatus of claim 9, wherein the identifier is based on one or more parameters of a certificate of the user equipment.

15. The apparatus of claim 9, wherein the first network interface is a first one of a wireless local area network access point and a cellular network access point, and the second network interface is a second one of the wireless local area network access point and the cellular network access point.

16. The apparatus of claim 9, wherein the first network interface is a first wireless local area network access point, and the second network interface is a second wireless local area network access point.

17. One or more non-transitory computer readable storage media encoded with instructions that, when executed by a processor, cause the processor to:
generate a chargeable user identity for a user equipment based on a first indication of an identifier obtained from the user equipment based on communications of the user equipment over a first network interface of a system;
obtain a second indication of the identifier based on communications of the user equipment over a second network interface of the system;
in response to obtaining the second indication of the identifier, determine that the user equipment is attempting to communicate over the second network interface; and
in response to determining that the user equipment is attempting to communicate over the second network interface, use the chargeable user identity for further communications of the user equipment over the second network interface.

18. The one or more non-transitory computer readable storage media of claim 17, wherein the instructions further cause the processor to:
provide a request for the identifier; and
in response to the request, obtain the first indication of the identifier or the second indication of the identifier.

19. The one or more non-transitory computer readable storage media of claim 17, wherein the instructions further cause the processor to:
in response to determining that the user equipment is attempting to communicate over the second network interface, enforce a network policy for the user equipment.

20. The one or more non-transitory computer readable storage media of claim 17, wherein the instructions further cause the processor to:
provide the chargeable user identity to a control plane entity associated with the second network interface.

* * * * *